United States Patent [19]

Kosmo et al.

[11] Patent Number: 4,887,749
[45] Date of Patent: Dec. 19, 1989

[54] DON/DOFF SUPPORT STAND FOR USE WITH REAR ENTRY SPACE SUITS

[75] Inventors: Joseph J. Kosmo, Seabrook; Terry O. Tri, Friendswood; William E. Spenny, League City; Philip R. West, Houston, all of Tex.

[73] Assignee: United States of America as represented by the Administrator, National Aeronautics and Space Administration, Washington, D.C.

[21] Appl. No.: 221,472

[22] Filed: Jul. 19, 1988

[51] Int. Cl.⁴ .............................. A47G 25/90
[52] U.S. Cl. ...................................... 223/111
[58] Field of Search ............... 223/1, 120; 2/2.1 R, 2/2.1 A

[56] References Cited

U.S. PATENT DOCUMENTS

| | | |
|---|---|---|
| 305,406 | 9/1884 | Sutton . |
| 775,508 | 11/1904 | Beam ............................ 223/111 |
| 860,653 | 7/1907 | Gagnon ........................ 223/111 |
| 2,810,212 | 10/1957 | Sturmer ........................ 223/120 |
| 2,811,293 | 10/1957 | Holm ............................ 223/111 |
| 3,574,236 | 4/1971 | Getchell et al. ................ 2/2.1 |
| 3,817,433 | 6/1974 | Thomas ........................ 223/111 |
| 4,091,465 | 5/1978 | Webbon et al. .............. 2/2.1 A |
| 4,593,415 | 6/1986 | Vykukal ...................... 2/2.1 A |

Primary Examiner—Werner H. Schroeder
Attorney, Agent, or Firm—Russell E. Schlorff; John R. Manning; Edward K. Fein

[57] ABSTRACT

A don/doff support stand for use with rear entry space suits is disclosed. The support stand is designed for use in one-g environments; however, certain features of the stand can be used on future space-craft, lunar or planetary bases. The present invention has a retainer which receives a protruding lug fixed on the torso section of the space suit. When the lug is locked in the retainer, the space suit is held in a generally upright position. In a one-g environment a portable ladder is positioned adjacent to the rear entry of the space suit supported by the stand. The astronaut climbs up the ladder and grasps a hand bar assembly positioned above the rear entry. The astronaut then slips his legs through the open rear entry and down into the abdominal portion of the suit. The astronaut then lowers himself fully into the suit. The portable ladder is then removed and the astronaut can close the rear entry door. The lug is then disengaged from the retainer and the astronaut is free to engage in training exercises in the suit. When suit use is over, the astronaut returns to the stand and inserts the lug into the retainer. A technician repositions the ladder. The astronaut opens the rear entry door, grasps the hand bar assembly and does a chin-up to extricate himself from the suit. The astronaut climbs down the movable ladder while the suit is supported by the stand.

12 Claims, 3 Drawing Sheets

DON/DOFF SUPPORT STAND FOR USE WITH REAR ENTRY SPACE SUITS

ORIGIN OF THE INVENTION

The invention described herein was made by employee(s) of the U.S. Government and may be manufactured and used by or for the Government of the U.S. of America for governmental purposes without the payment of any royalties thereon or therefor.

BACKGROUND OF THE INVENTION

1. Field of the Invention

This invention pertains to a don/doff support stand for use with rear entry space suits. The purpose of the stand is to support the space suit in a generally upright position to allow easy donning and doffing by an astronaut. The disclosure relates primarily to a stand for use in a one-g environment; however, certain features of the stand could be modified for use with spacecraft, lunar or planetary bases having a different gravity field strength. The stand is adjustable to accommodate astronauts of various heights. The retainer in the stand is tiltably mounted. When the retainer tilts the upper torso of the space suit likewise tilts. The purpose of the tiltably mounted retainer is to facilitate unimpeded entry and exit through the rear entry door of the space suit.

2. Description of the Prior Art

Prior art space suits having horizontal body seal closures are put on and taken off in a significantly different manner than the rear entry space suit to be used with the present invention. Because of the different modes of donning and doffing used with prior art space suits, the prior art support stands are significantly different from the present invention.

One prior art don/doff stand utilized a pair of locking cams which engaged a groove in the portable life support pack positioned on the back of prior art space suits. Because this groove was positioned on the back of the space suit, it was outside of the visual envelope of the astronaut. When the astronaut wished to use the prior art don/doff support stand, he would back up against the locking cams and, guided by a technician, would position the grooves on the back pack to engage the cams. This is a rather cumbersome technique because the astronaut could not visually guide his space suit into engagement with the don/doff stand. Once the suit was locked in and supported by the stand, the astronaut could focus on doffing the suit. First the astronaut would release the horizontal body seal closure which functions like a belt on a conventional pair of trousers. After releasing the horizontal body seal closure, the leg portions of the space suit would fall downward like a pair of trousers. The technician would then hold the arms of the space suit in a generally upright position and the astronaut would slide downward to get out of the upper torso portion of the prior art space suit.

In another prior art don/doff support stand locking pins were used to engage circular opposed orifices on the portable life support pack. Again these locking pins and orifices were outside the visual envelope of the astronaut which made engagement thereof difficult without the assistance of a technician.

The present invention overcomes the difficulties of the prior art by positioning the locking lug and retainer within the visual envelope of the astronaut. It further provides for a hand bar assembly which allows the astronaut easy access through the rear entry.

BRIEF SUMMARY OF THE INVENTION

The don/doff support stand for use with rear entry space suits is designed primarily for use in one-g environments; however, certain features of the stand could be modified for use with spacecraft, lunar or planetary bases. The stand supports the rear entry suit in a generally upright position to facilitate donning and doffing by an astronaut. The stand also has a tilt mechanism which allows the upper torso of the suit to tilt downwardly through a range of approximately 25° which enables the astronaut to have unencumbered access to the rear entry. To don the space suit, a portable ladder is first positioned adjacent to the rear entry of the suit. The upper portion of the suit is then tilted downwardly causing the rear entry door to likewise tilt downwardly. Although the stand has the capability to tilt through a 25° angle, astronauts seem to prefer a 15° of tilt. However, the precise degree of tilt is primarily a matter of personal preference by the user. The rear entry door is then opened. The astronaut then climbs the portable ladder and grasps a hand bar assembly positioned immediately above the rear entry. The astronaut then swings his feet from the ladder into the rear entry through the abdominal portion of the suit and into the leg portion of the suit. The astronaut then relaxes his grip on the hand bar assembly, allowing his body to fully slide from above into the suit. The rear entry door can then be closed by the astronaut. A technician removes the portable ladder from the rear of the stand. The astronaut then tilts the retainer back to its horizontal position and disengages the lug from the retainer. The astronaut then backs away from the don/doff stand. The astronaut is then free to engage in training exercises.

To take the suit off, the process is essentially reversed. The astronaut walks up to the don/doff stand and visually guides the lug into engagement with the retainer. The lug automatically locks when it is fully inserted in the retainer. The retainer is then tilted approximately 15° or more downwardly and the rear entry door is opened. The astronaut slips his arms out of the space suit and reaches up to the hand bar assembly. Doing a chin-up, the astronaut pulls himself out of the space suit and lifts his legs back onto the portable ladder positioned immediately adjacent to the rear entry door. Tilting the space suit approximately 15° or more downwardly allows the astronaut an unencumbered upward reach toward the overhead hand bar assembly. The stand is also adjustable for astronauts of various heights.

BRIEF DESCRIPTION OF THE DRAWINGS

FIG. 9 is a cross section of the locking assembly along line 9—9 of FIG. 7; and

FIG. 10 is a cross section of the removable retainer pin, channel and tongue taken along line 10—10 of FIG. 6.

DETAILED DESCRIPTION OF THE INVENTION

Figure 1:
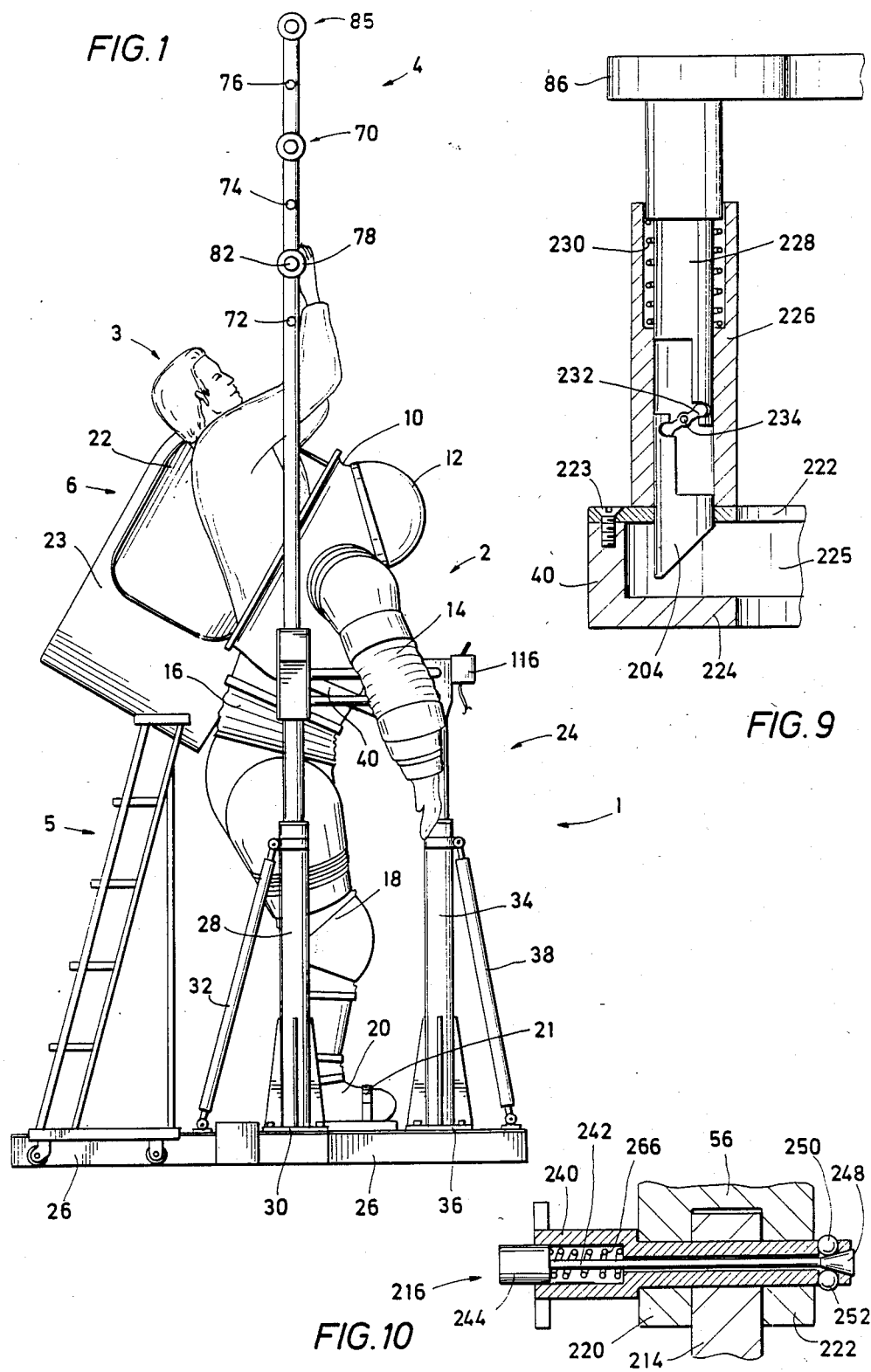
FIG. 1 is a side view of the don/doff support stand with a rear entry space suit mounted therein and tilted downwardly at approximately 15°. An astronaut is shown hanging onto the hand bar assembly and lowering himself into the space suit through the open rear entry door. A portable ladder is positioned near the rear entry door.

In FIG. 1 the don/doff support stand is generally identified by the numeral 1. A rear entry space suit is generally identified by the numeral 2 and is supported by the don/doff stand 1. The space suit is shown tilted downwardly approximately 15° to allow the astronaut, generally identified by the numeral 3, unencumbered upward reach for the overhead hand bar assembly, generally identified by the numeral 4. A portable ladder is identified by the numeral 5 and is positioned adjacent to the rear entry, generally identified by the numeral 6, of the space suit 2.

The space suit 2 includes a hard upper torso 10 which has a face plate 12 mounted on the upper portion thereof to allow the astronaut to see out of the suit 2. A pair of movable arms extends from the upper torso 10 of the suit 2. Only the right arm 14 is visible in FIG. 1. Extending downward from the hard upper torso is a flexible abdominal joint 16. Extending downwards from the flexible abdominal joint 16 is a pair of legs. Only the right leg 18 is shown in FIG. 1. Connected to the legs are a pair of boots with the right boot 20 shown in FIG. 1. The boots are held in place by a toe/heel clip retaining means. The right toe hook 21 which is a part of said retaining means is shown in FIG. 1. The hard upper torso 10 has a rear entry generally identified by the numeral 6. The rear entry is sealed by a rear entry door 22. A portable life support system 23 is mounted on the door 22.

An adjustable pedestal assembly is generally identified by the numeral 24. The adjustable pedestal assembly is supported on a base 26 which is better shown in FIG. 3. A first telescoping tubular leg 28 is attached to the base 26 by the flange 30. The telescoping tubular leg 28 is further connected to the base 26 by a support strut 32. The first flange 30 and the first strut 32 add strength and rigidity to the first telescoping tubular leg 28. A second telescoping tubular leg 34 is likewise connected to the base 26 by a flange 36. The second telescoping tubular leg 34 is further connected to the base 26 by a second support strut 38. The flange 36 and the second support strut 38 add rigidity and strength to the second telescoping tubular leg 34. There are three legs arranged in a triangle around the space suit to provide stable support to the user.

A retainer 40 is shown tilted approximately 15° from the horizontal. The retainer receives a protruding locking lug, not seen in FIG. 1, which is mounted on the lower portion of the torso 10 of the space suit 2. When the locking lug is inserted into the retainer 40 and the retainer 40 is tilted downward, the torso 10 of the space suit 2 likewise tilts downwardly.

Figure 2:
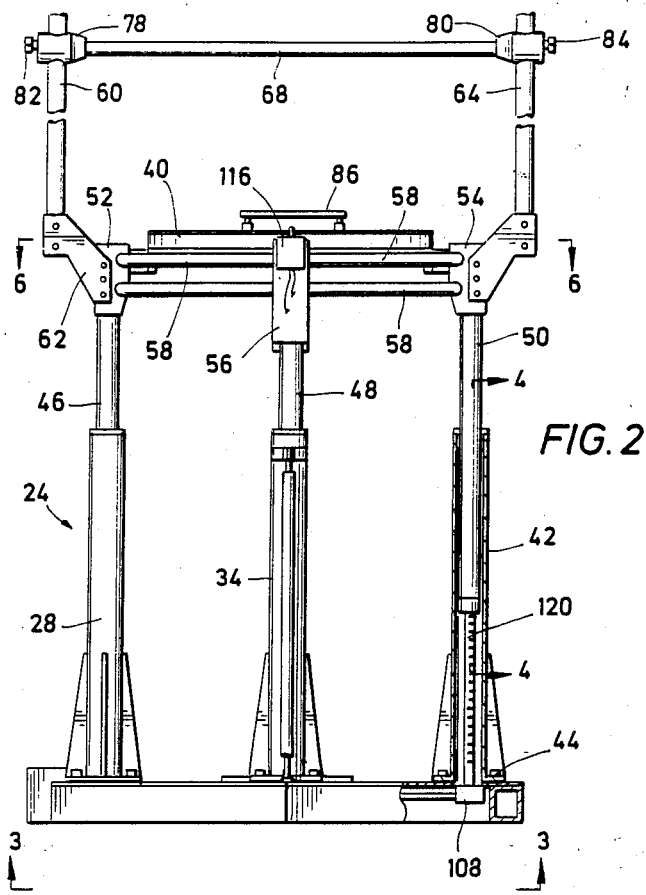
FIG. 2 is a front view of the don/doff support stand and hand bar assembly without the presence of a space suit. One of the telescoping legs is shown in partial sectional view.

In FIG. 2 the adjustable pedestal assembly 24 is seen in front view. The first telescoping tubular leg 28 and the second telescoping tubular leg 34 are seen from a different perspective. A third telescoping tubular leg 42 is also shown attached to the base 26 by flange 44. The three telescoping tubular legs, 28, 34 and 42, are arranged in a triangular pattern better seen in FIG. 3. Leg 28 has an extension member 46 which can be vertically adjusted for height as will be discussed hereinafter. Leg 34 likewise has an extension member 48 which can also be adjusted for height. Leg 42 also has an extension member 50 which can be simultaneously adjusted for height along with extension members 46 and 48.

A first joint 52 is mounted on the extension member 46 of leg 28. A similar and second joint 54 is mounted on the extension member 50 of the third leg 42. A perforated channel 56 is mounted on extension member 48 of leg 34. The perforated channel 56 is better seen in FIG. 8. A semicircular bracket 58 extends from and connects with the first joint 52, the perforated channel 56 and the second joint 54.

The hand bar assembly 4 has a first vertical support 60 which is mounted on the joint 52 by support member 62. A second vertical support 64 is mounted on the second joint 54 by the second support member 66. A first horizontal support 68 is adjustably connected to the first vertical support 60 and the second vertical support 64. A second horizontal support 70, better seen in FIG. 1 is likewise connected to first vertical support 60 and second vertical support 64. The vertical support 60 has a plurality of perforations 72, 74 and 76 therein. Likewise, vertical support 64 has a plurality of matching perforations therein, not shown in the figures. The horizontal support 68 has a first slip guide 78 which travels on the first vertical support 60. The first horizontal support 68 has a second slip guide 80 mounted on the opposite end thereof which likewise travels on the second vertical support 64. The slip guides 78 and 80 can be locked into place by locking pins 82 and 84 which align and coact with the plurality of perforations in the vertical supports 60 and 64. A third horizontal support 85 mounts on vertical support 60 and vertical support 64.

Figure 4:
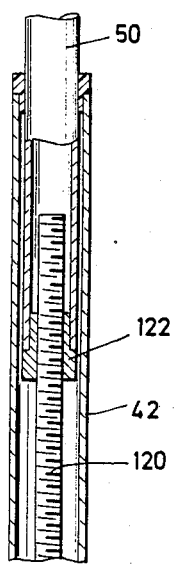
FIG. 4 is an enlarged sectional view of one of the telescoping tubular legs taken along line 4—4 of FIG. 2.

The third telescoping tubular leg 42 is shown in partial section in FIG. 4. A worm gear assembly 108 connects to the extension member 50 by a threaded shaft 120. Actuation of the worm gear assembly 108 and the threaded shaft 120 cause the extension member 50 to be raised or lowered as will be discussed hereinafter. The worm gear assembly 108 connects via a power train to an electric motor better shown in FIG. 3.

Figure 3:
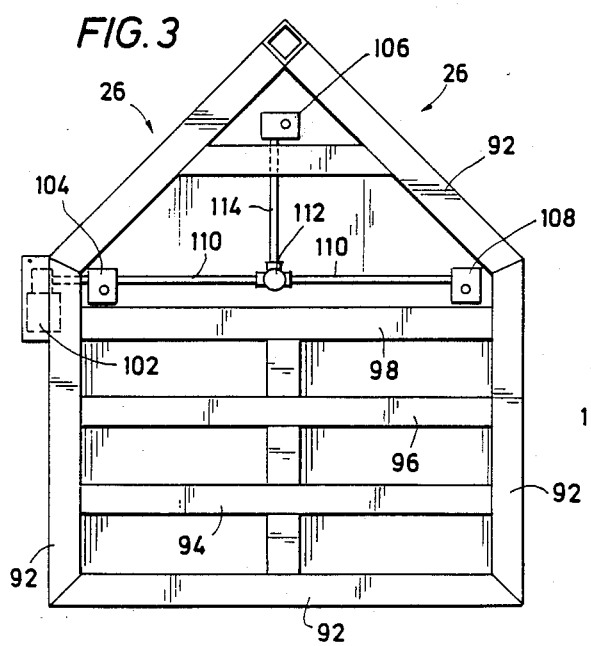
FIG. 3 is a view of the base taken along line 3—3 of FIG. 2.

In FIG. 3 the base 26 is viewed from the underside. A channel frame 92 surrounds and strengthens the exterior perimeter of the base 26 of the pedestal assembly. Additional interconnecting channel supports 94, 96, 98 and 100 further strengthen and reinforce the base 26. An electric motor 102 is mounted in one side of the base 26. The electric motor receives power from a remote source not shown in the drawings via an extension cord or other conventional electrical hook cable. The motor is controlled by a switch 116 better seen in FIG. 1. The first leg 28 and its extension member 46 are connected to a worm gear assembly 104 by a threaded shaft, not shown. The second leg 34 and its extension member 48 are connected to a second worm gear assembly 106 and a threaded shaft, not shown. The third leg 42 and its extension member 50 are connected to a third worm gear assembly 108 by the threaded shaft 120. The three legs are positioned directly above the worm gear assemblies 104, 106 and 108 in a triangular configuration. An enlargement of the worm gear assembly 106 is shown in cross sectional view in FIG. 5.

The worm gear assemblies 104, 106 and 108 are essentially similar and are well known to those skilled in the art. Worm gear assembly 108 has a threaded shaft 120 connected thereto. The other worm gear assembly 104 also has a threaded shaft, not shown in the drawings, connected to extension member 46. The worm gear assembly 106 likewise has a threaded shaft, not shown in the drawings, connected to extension member 48. The motor 102 is connected to worm gear assemblies 104 and 108 by a shaft 110. A bevel gear drive 112 connects shaft 114 with the worm gear assembly 106. The shafts 110 and 114 and the bevel gear drive 112 constitute a power train which is connected to the motor 102 for transmitting rotational force from the motor to the worm gear assemblies 104, 106 and 108. The motor 102 is controlled by a switch 116 better shown in FIG. 1. The switch 116 is wired to the motor 102. The switch has the following three positions: off, forward and reverse. When the motor is actuated, the power train transmits rotational force to the worm gear assemblies 104, 106 and 108 and thence to the threaded shafts. When the threaded shafts rotate the extension members 46, 48 and 50 either extend or retract, depending on the direction of rotation of the threaded shafts.

In FIG. 4 the threaded shaft 120 is shown in section view inside the third leg 42. The threaded shaft 120 connects with a bushing 122 which is mounted on one end of the extension member 50. The extension member 50 is aligned and mounted in the third leg 42 by a bushing 124. When the threaded shaft 120 is turned clockwise, the extension member 50 is retracted into the third leg 42. When the threaded shaft 120 is turned counterclockwise the extension member 50 is extended beyond the third leg 42.

When the motor 102 is driven in the opposite direction the power train transmits force to the worm gears 104, 106 and 108 causing the threaded shafts in the first leg 28, the second leg 34, and the third leg 42 to simultaneously rotate, thereby simultaneously adjusting the height of the three extension members 46, 48 and 50. When the switch is in the forward position, the overall height of the adjustable pedestal assembly is raised. When the height of the pedestal assembly is raised, the distance from the base 26 and the semicircular bracket 58 increases. When the switch is in the reverse position, the overall height of the adjustable pedestal assembly is reduced. When the height is reduced the distance between the base 26 and the semicircular bracket 58 is reduced. This adjustable height feature is designed to accommodate astronauts of differing heights.

Figure 5:
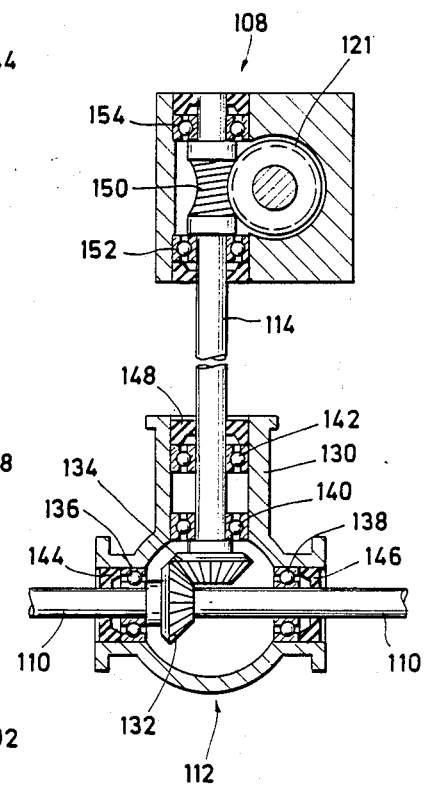
FIG. 5 is an enlarged sectional view of the differential and worm drive assembly shown in FIG. 3.

In FIG. 5 the bevel gear drive 112 is shown in sectional view as is the worm gear assembly 106. The bevel gear drive 112 has a housing 130 which contains a first spiral bevel gear 132 and a second spiral bevel gear 134. The first gear 132 is mounted on shaft 110 which is supported by a first bearing 136 and a second bearing 138. The second gear 134 is mounted on the shaft 114 which is supported by bearings 140 and 142. The first gear 132 engages the second gear 134. The housing 130 is sealed against the atmosphere by first end cap 144, a second end cap 146 and a third end cap 148.

The worm gear assembly 106 is driven by the shaft 114 which connects to the worm gear 150. The shaft 114 is supported by bearings 152 and 154. The worm gear 150 meshes with the threaded shaft 121. When the shaft 110 is turned by the electric motor 102, gear 132 imparts rotational force to the gear 134 which imparts rotational force to the shaft 114, thus driving the worm gear 150 and the threaded shaft 121.

Figure 6:
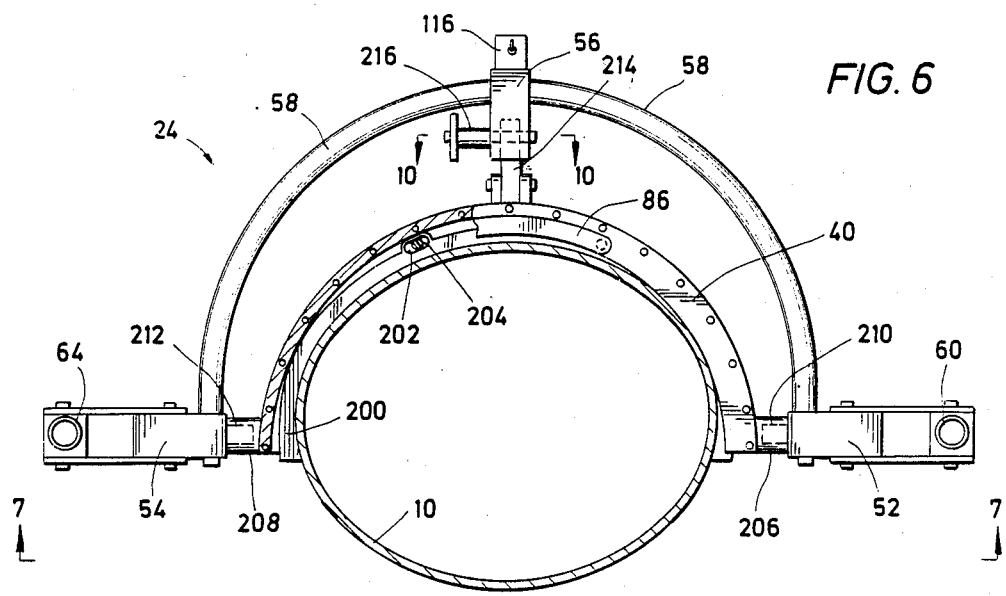
FIG. 6 is a top view of the don/doff support stand taken along line 6—6 of FIG. 2 with a portion of the retainer shown in cross section. A portion of the space suit and protruding locking lug is also shown in FIG. 6.

FIG. 6 is a plan view of the adjustable pedestal assembly 24. The semicircular bracket 58 is shown connected to the first joint 52, the second joint 54 and the perforated channel member 56. The semicircular bracket 58, the first joint 52, the second joint 54 and the perforated channel member 56 are rigidly connected and are adjustable only in height by means of the three telescoping tubular legs connected to the first joint 52, the second joint 54 and perforated channel 56 as shown in FIG. 2. The tiltable retainer 40 is shown in its horizontal position inside the adjustable pedestal assembly. A portion of the retainer 40 is shown in section view to reveal the protruding locking lug 200 engaged with the retainer 40. The locking lug 200 is connected to the torso 10 of the space suit 2 shown in cross sectional view. The protruding locking lug 200 has a hole 202 therein which engages the latch 204. The latch 204 is better seen in cross-sectional view in FIG. 9. When the astronaut pushes the locking lug 200 into engagement with retainer 40, the latch 204 passes through the hole 202 thus locking the lug 200 into the retainer 40. When the locking lug 200 is engaged in the retainer 40, the space suit 2 is fully supported and stands in a generally upright position. The retainer 40 is formed by an upper lip 222 joined to a lower lip 224. In between the upper lip 222 and the lower lip 224 is an opening 225 which receives the locking lug 200. This configuration of the retainer is best seen in cross sectional view in FIG. 9.

The retainer 40 has a first bushing 206 mounted on one end thereof and a second bushing 208 mounted on the second end thereof. The first bushing 206 receives a shaft 210 shown in phantom in FIG. 6. The shaft 210 is rigidly mounted and extends from the first joint 52. The bushing 206 is connected to the retainer 40 and receives and engages the first shaft 210. A second shaft 212, likewise shown in phantom, extends from the second joint 54 and engages a second bushing 208 rigidly connected to the retainer 40.

The shafts 210 and 212 are coaxially aligned and opposing. The shafts 210 and 212 coact with the bushings 206 and 208 to provide a means for adjusting the tilt of the retainer relative to the pedestal assembly. The degree of rotation is limited to approximately 25° as will be discusses hereinafter. A tongue 214 is connected to and extends from the retainer 40. The tongue 214 extends from the retainer 40 into the perforated channel 56. A removable locking pin 216 passes through the perforations in the channel 56 and the perforation 218 of the tongue 214. The locking pin 216 fixes the relationship of the retainer 40 and pedestal assembly 24. The size of the channel 56 and the number of perforations therein determine the degree of tilt for the retainer 40 as better seen in FIG. 8.

Figure 7:
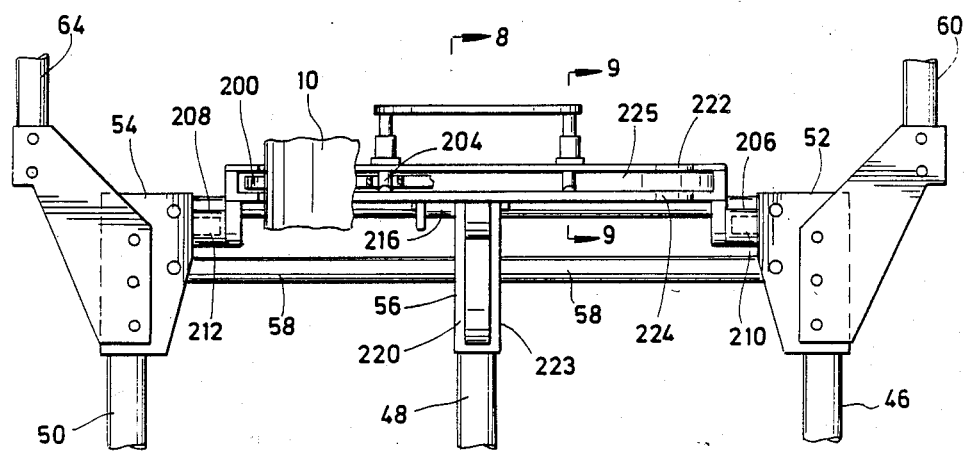
FIG. 7 is a side view of the don/doff support stand and retainer taken along line 7—7 of FIG. 6. Also shown is a portion of the space suit and the protruding locking lug.

In FIG. 7 the first extension member 46 is shown connected to the first joint 52. The second extension member 48 is shown connected to the perforated channel 56. The third extension member 50 is shown connected to the second joint 54. The first joint 52, the channel 56 and the second joint 54 are rigidly interconnected by the semicircular bracket 58. The first shaft 210 is shown in phantom view extending from first joint 52 and the second shaft 212, shown in phantom, is shown extending from the second joint 54. The first bushing 206 extends from the retainer 40 and engages the first shaft 210. The second bushing 208 extends from the retainer 40 and engages the second shaft 212. The tongue 214 extends from the retainer 40 and engages the channel 56. The channel 56 has a first side 220 and a second side 223 which form the channel and received the tongue 214.

The tiltably mounted retainer 40 is a curved member better seen in FIG. 6 sized to receive the protruding locking lug 200 of the space suit 2. The curved channel member has an upper lip 222 and a lower lip 224 and an opening 225 formed between the two lips. The locking lug 200 fits in the opening 225 between the upper lip 222 and the lower lip 224. A portion of the torso 10 of the space suit 2 is likewise shown with the locking lug 200 extending therefrom and engaging the retainer 40.

Figure 8:
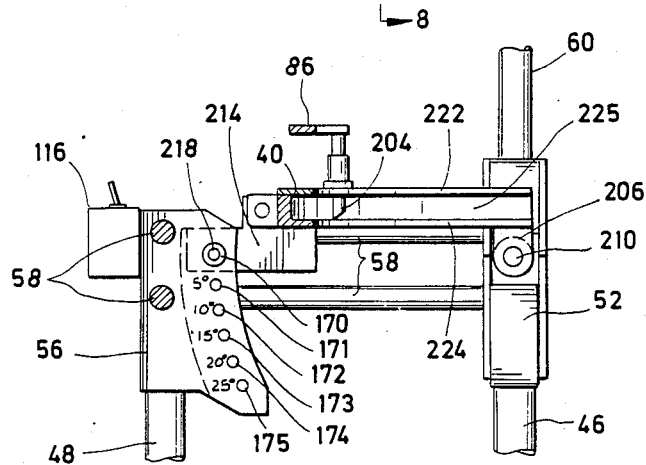
FIG. 8 is a side view of the retainer and channel used for tiltably adjusting the retainer. The retainer is shown in partial sectional view revealing the locking assembly which engages the protruding locking lug.

In FIG. 8 the extension member 46 of first leg 28 is shown connected to the first joint 52. The first shaft 210 extends from the first joint 52 and is surrounded by the bushing 206. The bushing 206 is connected to the retainer 40. The release bar 86 is mounted on the retainer 40. The latch 204 extends into the opening 225 of the retainer 40. The tongue 214 extends from the retainer 40 and has a perforation 218 therein. The tongue 214 fits into the channel 56. The channel 56 is mounted on the extension member 48 of the second leg 34. The semicircular bracket 58 is shown extending from the first joint 52 to the channel member 56. A plurality of coaxially aligned perforations 170, 171, 172, 173, 174, and 175 are formed in both the first side 220 and the second side 223 of the channel 56 to allow the removable locking pin 216 to pass therethrough and to engage with the perforation 218 of the tongue 214 thus fixing the degree of tilt of the retainer 40 relative to the pedestal assembly.

In FIG. 9, the retainer 40 has a curved channel member having a first lip 222 joined by screws or other fasteners 223 to the lower lip 224. An opening 225 is formed between the upper lip 223 and the lower lip 224. A release bar 86 is mounted on the retainer 40 in a housing 226. The release bar 86 is connected to a hook 228 which extends into the housing 226. A spring 230 surrounds the hook 228 inside the housing 226 urging the release bar upwardly and away from the retainer 40. A movable toggle 232 is mounted on a shaft 234 inside housing 226. The hook 228 engages one end of the toggle 232. The toggle 232 rotates about the shaft 234 when actuated by the hook 228. The latch 204 engages the other end of the toggle 232. When the release bar 86 is manually depressed, the hook 228 actuates the toggle 232 which withdraws the latch 204 from the opening 225 in the retainer 40. When the latch 204 is withdrawn from the retainer 40, it disengages the lug 200 extending from the space suit 2. When the locking lug 200 is disengaged from the latch 204, the space suit can be removed from the don/doff stand 1.

FIG. 10 is a cross section view of the tongue 214 shown in engagement with the channel 56. The removable locking pin 216 passes through a perforation 230 in the first lip 220, a perforation 218 in the tongue, a perforation in the second lip 222 of the channel 56, thus temporarily positioning the tongue and the channel 56 in a fixed relationship. The removable locking pin 216 has a barrel 240 which contains an elongate shaft 242. The shaft 242 is connected to a button 244 which is urged by spring 266 away from the barrel 240. The shaft 242 has a conical end section 248 which engages a plurality of ball bearing 250 and 252. The ball bearings 250 and 252 extend beyond the exterior diameter of the barrel 240 when the button 244 is in its relaxed position as shown in FIG. 10. In order to remove the locking pin 216 from the channel 56 and the tongue 214, the button 244 must be depressed against the force of the spring 266. When the button 244 is depressed, the shaft 242 moves through the barrel 240 and urges the conical member 248 away from the ball bearings 250 and 252. The ball bearing then can be moved inwardly toward the shaft 242. When the ball bearings move inwardly, they no longer protrude beyond the exterior diameter of the barrel 240 which allows the locking pin to be withdrawn from the second side 223 of the channel 50, the tongue 214 and the first side 220 of the channel 56. When the locking pin 216 is withdrawn from the tongue 214 and the channel 56, the tongue 214 is free to tilt in the channel 56 through approximately 25° of angle.

The don/doff support stand described herein for use with rear entry space suits is a significant advancement over prior art devices. The present invention can be adjusted to various heights to accommodate different sized astronauts. The retainer in the don/doff stand can be tilted downward to facilitate unencumbered access to the rear entry door of the space suit. Engagement of the locking lug on the space suit with the retainer provides a positive means for supporting the suit in a generally upright position during donning and doffing. The locking lug and the retainer are within the visual envelope of the astronaut. These and other features described herein represent significant improvements and advances in the design and use of don/doff stands.

While the foregoing is directed to the preferred embodiment, the scope thereof is determined by the claims which follow:

We claim:

1. A don/doff support stand for use with rear entry space suits having at last one protruding locking lug comprising:
    (a) an adjustable pedestal assembly;
    (b) a retainer to receive said lug and support said space suit, said retainer tiltably mounted on said pedestal assembly;
    (c) means for locking said lug in said retainer; and
    (d) means for adjusting the tilt of said retainer relative to said pedestal assembly, said retainer causing said locking lug and said rear entry of said space suit to simultaneously tilt when said means for adjusting said tilt is actuated.

2. The apparatus of claim 1 further including a hand bar assembly to be grasped by a person to facilitate ingress and egress into said space suit through said rear entry when said lug and said suit are locked in said retainer.

3. The apparatus of claim 2 further including means for adjusting the height of said pedestal assembly.

4. The apparatus of claim 3 wherein said means for locking said lug in said retainer comprises:
    (a) a release bar mounted on said retainer;
    (b) at least one latch mounted in said retainer to engage said locking lug; and
    (c) means for engaging and disengaging said latch and said lug, said engaging means connected to said release bar and arranged to disengage said latch from said lug when said bar is depressed.

5. The apparatus of claim 4 wherein said means for adjusting the tilt of said retainer comprises:
   (a) a perforated tongue protruding from said retainer, movement of said tongue causing said retainer to tilt up or down;
   (b) a perforated channel sized to receive said tongue through approximately 25° of movement, said channel mounted on said pedestal assembly; and
   (c) a removable locking pin sized to pass through said perforations in said channel and said perforations in said retainer to temporarily position said tongue and said channel in fixed relationship.

6. The apparatus of claim 5 wherein said adjustable pedestal assembly comprises:
   (a) a base;
   (b) a plurality of telescoping tubular legs having a first and second ends, said first end mounted on said base;
   (c) a semicircular bracket connected to said second end of said legs said bracket having a first and second end;
   (d) a first shaft extending from the first end of said semicircular bracket near one of said legs; and
   (e) a second shaft extending from the second end of said semicircular bracket near another of said legs said second shaft coaxially aligned with said first shaft.

7. The apparatus of claim 6 wherein said means for adjusting the height of said pedestal assembly comprises:
   (a) an electric motor mounted in said base;
   (b) a worm gear mounted in each of said tubular legs, said gear causing said telescoping tubular legs to extend or retract when actuated;
   (c) a power train means for transmitting rotational force from said motor to said worm gears; and
   (d) switch means for controlling said motor to raise or lower the height of said pedestal assembly.

8. The apparatus of claim 7, wherein said tiltably mounted retainer comprises:
   (a) a curved channel member sized to receive said protruding locking lug, said curved channel member having a first end and a second end;
   (b) a first bushing mounted on said first end of said curved channel member, said bushing sized to receive and freely rotate on said first shaft; and
   (c) a second bushing mounted on said second end of said curved channel member, said second bushing sized to receive and freely rotate on said second shaft, said bushings supporting said retainer on said shafts and allowing said retainer to tilt in relationship to said pedestal assembly.

9. The apparatus of claim 8 wherein said hand bar assembly comprises:
   (a) a first vertical support mounted on said pedestal assembly;
   (b) a second vertical support mounted on said pedestal assembly;
   (c) a first horizontal support adjustably connected to said first vertical support and said second vertical support;
   (d) a second horizontal support adjustably connected to said first vertical support and said second vertical support above said first horizontal support;
   (e) means for adjusting the height of said first horizontal support; and
   (f) means for adjusting the height of said second horizontal support.

10. The apparatus of claim 9 further including:
    (a) said space suit having a left boot and a right boot; and
    (b) means for detachably mounting said left and right boots on said pedestal assembly.

11. A support rack for used with a rear entry space suit comprising:
    (a) said space suit having a protruding lip positioned near the abdominal portion of said space suit;
    (b) a retainer to receive said lip; and
    (c) means for locking said lip in said retainer, said retainer supporting said space suit when said lip is locked in said retainer.

12. The apparatus of claim 11 wherein said means for locking said lip in said retainer comprises:
    (a) a release bar mounted on said retainer;
    (b) at least one latch mounted in said retainer to engage said lip; and
    (c) means for engaging and disengaging said latch and said lip, said engaging means connected to said release bar and arranged to disengage said latch from said ring when said bar is depressed.

* * * * *